United States Patent Office
3,281,416
Patented Oct. 25, 1966

3,281,416
ANTHRAQUINONE COMPOUNDS
Herbert Francis Andrew and Dennis Eckersley, Manchester, England, assignors to Imperial Chemical Industries Limited, London, England, a corporation of Great Britain
No Drawing. Filed Sept. 9, 1964, Ser. No. 395,304
Claims priority, application Great Britain, Nov. 1, 1963, 43,219/63
5 Claims. (Cl. 260—240)

This invention relates to new anthraquinone compounds valuable for use as reactive dyestuffs, especially for cellulose textile materials. More particularly, the invention is directed to new green water-soluble anthraquinone reactive dyestuffs and their manufacture and use for colouring textile materials.

A number of anthraquinone dyestuffs have previously been described for use as green reactive dyestuffs. Such dyestuffs fall generally into two broad classes,
 (a) the anthraquinone moiety itself is green, e.g. a 1:4-diarylamino type, and
 (b) the anthraquinone moiety itself is blue or greenish-blue and the radical of a yellow compound is linked thereto to give a "mixed chromophore" green.

Dyestuffs of the type (a) suffer from the disadvantages, in general, of dullness in shade and a lack of ability to give strong dyeings; in addition the symmetrical type of structure in which the two aryl groups are the same, are deficient in water-solubility whilst those in which the two aryl groups are different can be rendered sufficiently water-soluble but are difficult and expensive to manufacture. Dyestuffs of the type (b) suffer from the disadvantages of weakness in shade and of having too great a tendency to stain during washing-off processes.

It is a purpose of the present invention to provide dyestuffs which overcome these disadvantages, namely, dyestuffs which are readily manufactured and of good water-solubility, and are capable of building up to give strong, bright green dyeings of excellent washing fastness, especially as regards staining during the washing-off process.

According to the invention, there are provided the water-soluble anthraquinone compounds of the formula:

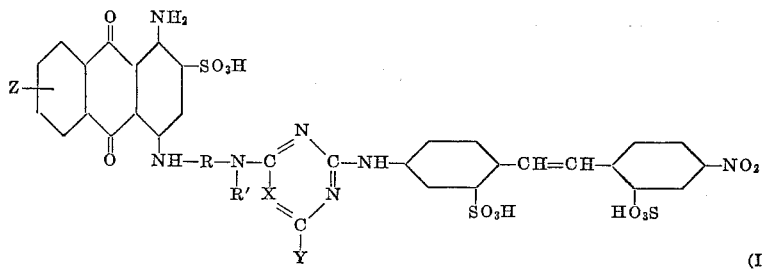

(I)

wherein
Z stands for H or SO₃H
R stands for a benzene, stilbene or diphenyl radical,
R' stands for a hydrogen atom or a lower alkyl group,
X stands for a nitrogen atom or a carbon atom to which is attached a chlorine or bromine atom or a nitro, or cyano group, and
Y stands for a chlorine atom or a bromine atom or a quaternary ammonium group.

Throughout this specification, the term "lower" used in connection with alkyl or alkoxy groups is intended to refer to such a group having up to and including 4 carbon atoms.

As examples of quaternary ammonium groups represented by Y, there may be mentioned, for example, trimethylammonium, pyridiniumyl 1,4-diazobicyclo-[2,2,2,] octanyl, N-methylpyrrolidiniumyl, N,N-dimethylhydraziniumyl, N-methylisoindoliniumyl, 3-carboxypyridiumyl and 1-aminopiperidinium-1-yl.

The benzene, stilbene or diphenyl radical represented by R may be unsubstituted but is preferably substituted, for example, by methyl, lower alkoxy, chlorine, carboxy or, more especially, sulphonic acid.

The water-soluble anthraquinone compounds of the invention in which Y of Formula I stands for chlorine or bromine can be obtained by condensing a heterocyclic compound of the formula:

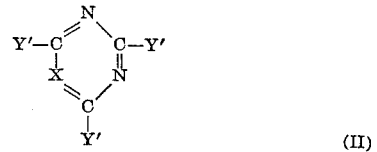

(II)

wherein X has the meaning stated above and Y' stands for a chlorine or a bromine atom, with one mole of an aminoanthraquinone compound of the formula:

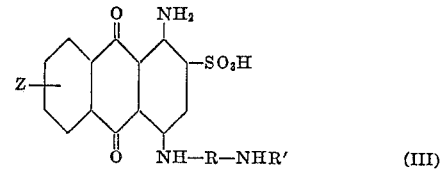

(III)

wherein R, R' and Z have the meanings stated above and with one mole of 4-nitro-4'-aminostilbene-2,2'-disulphonic acid. This process forms a further feature of the invention.

The heterocyclic compounds which can be used in the above process are cyanuric chloride, cyanuric bromide, 5-cyano-2,4,6-trichloropyrimidine, 5-nitro-2,4,6-trichloropyrimidine, 2:4:5:6-tetrachloropyrimidine, 2:4:5:6-tetrabromopyrimidine, 5-cyano-2:4:6-tribromopyrimidine and 5-nitro-2,4,6-tribromopyrimidine.

The amino anthraquinone compounds used in the above process are well known and can be obtained, for example, by condensing a compound of the formula:

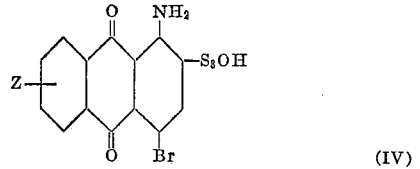

(IV)

with a diamine of the formula NH₂—R—NHR', for example m and p-phenylenediamines, 2,4- and 2,5-diaminobenzene sulphonic acids, 2,4- and 2,5-diaminotoluenes, 2,4- and 2,5-diaminoanisoles, 2,4- and 2,5-diaminochlorobenzenes, benzidine, benzidine-3-sulphonic acid, benzidine-2:2'-disulphonic acid and 4,4'-diaminostilbene-2,2'-disulphonic acid.

In some cases it is convenient to use a mixture of compounds of Formula IV, the resultant mixture of aminoanthraquinone compounds of Formula III being used in the process of the invention.

The above process can conveniently carried out by stirring an aqueous suspension of the heterocyclic compound with the reagents until condensation has been effected; the condensations are preferably carried out in two separate steps, but the two amino compounds can be reacted in either order. It is advantageous to maintain the reaction medium at about neutrality by the addition of an acid-binding agent to neutralise liberated acid as condensation proceeds; sodium carbonate, sodium bicarbonate or caustic soda can conveniently be used for this purpose. The first stage is normally carried out at a temperature of below 5° C., but in the case of halogenopyrimidines it is sometimes necessary to use a slightly higher temperature, for example up to 60° C. The second condensation is normally effected at a somewhat higher temperature, for example at a temperature between 50° C. and 90° C. If desired, the primary condensation product resulting from the first condensation stage can be isolated from the reaction medium, for example by salting followed by filtration, before use, either in the crude or a purified state, in the second condensation stage.

The final dyestuff can be isolated by the usual methods for water-soluble dyestuffs, preferably by salting-out followed by filtration and drying, but also by drying, for example spray-drying, the whole of the reaction mixture. If desired, diluents such as urea, sodium chloride and/or sucrose, can be added to the dyestuff paste before drying or to the dyestuff powder after drying.

The water-soluble anthraquinone compounds of the invention in which Y of Formula I stands for a quaternary ammonium group can be obtained by reacting the corresponding compound in which Y stands for a chlorine or a bromine atom with a tertiary amine.

As examples of tertiary amines which can be used, there may be mentioned trimethylamine, pyridine, 1,4-diazobicyclo-[2,2,2]-octane, N-methylpyrrolidine, N:N-dimethylhydrazine, N-methylisoindoline, N-ethylisoindoline, nicotinic acid and N-aminopiperidine.

This process can conveniently be carried out by stirring together a mixture of the anthraquinone compound and the tertiary amine in aqueous medium, for example at a temperature between 10° C. and 90° C. depending on the tertiary amine used. The resultant products can be isolated in similar manner to the corresponding chloro or bromo compounds.

The water-soluble anthraquinone compounds of the invention are valuable for colouring cellulose textile materials, for example, textile materials comprising natural or regenerated cotton. For colouring such textile materials the water-soluble anthraquinone compounds are preferably applied, either by a dyeing or printing process, to the cellulose textile materials in conjunction with a treatment with an acid-binding agent, for example sodium hydroxide, sodium carbonate or sodium bicarbonate, which may be applied to the cellulose textile material before, during or after the application of the dyestuffs. Alternatively when the colouration process involves the use of a heating step a substance can be used, for example sodium trichloroacetate, which is changed into an acid-binding agent during the heating step. When so applied to cellulose textile materials the water-soluble anthraquinone compounds react with the cellulose and can be built up to give strong bright green shades having very good fastness to light and to wet treatments especially to severe washing.

The invention is illustrated but not limited by the following examples in which parts and percentages are by weight:

*Example 1*

A solution of 15.87 parts of the trisodium salt of a mixture of 1 - amino-(4-4'-aminoanilino)anthraquinone-2:3':5 and -2:3':8 trisulphonic acids in 250 parts of water is added, during 20 minutes at a temperature of 0–50° C., to a stirred suspension of 4.85 parts of cyanuric chloride in 40 parts of acetone and 150 parts of water. The reaction mixture is stirred for a further 20 minutes at 0–50° C. whilst the pH of the reaction is maintained at 4–5 by the gradual addition of 2N-sodium carbonate solution. The reaction mixture is filtered, the filtrates are stirred whilst the pH of the filtrates is adjusted to 7 and a solution of 11.1 parts of the disodium salt of 4'-nitro-4-aminostilbene-2:2'-disulphonic acid in 125 parts of water is added. The temperature of the reaction mixture is raised to 35–40° C. and is maintained at 35–40° C. for 75 minutes, the temperature of the reaction is raised to 45–50° C. and is maintained at this temperature for 2 hours. The pH of the reaction mixture is maintained throughout the heating period at 6.0–6.5 by the gradual addition of 2N-sodium carbonate solution. 150 parts of sodium chloride are added, the reaction mixture is stirred for 1 hour, the precipitated dyestuff is filtered, washed on the filter with a solution of 100 parts of sodium chloride in 500 parts of water and is finally dried in vacuo at room temperature. The resultant dyestuff is found on analysis to contain 1 hydrolysable chlorine atom for each molecule of dyestuff.

When applied to cellulosic textile materials in conjunction with a treatment with an acid-binding agent the dyestuff yields yellowish green shades having good fastness to light and to washing.

*Example 2*

A solution of 13.32 parts of the disodium salt of 1-amino-4 - (3' - aminoanilino)anthraquinone - 2:4' - disulphonic acid in 200 parts of water is added during 20 minutes at 0–5° C. and pH 4–5 to a stirred suspension of 4.85 parts of cyanuric chloride in 40 parts of acetone and 150 parts of water. The reaction mixture is stirred for a further 20 minutes at 0–5° C. whilst the pH of the reaction is maintained at 4–5 by the gradual addition of 2 N-sodium carbonate. The reaction mixture is filtered, the filtrates are stirred and the pH is adjusted to 7 and a solution of 11.1 parts of the disodium salt of 4'-nitro-4-aminostilbene-2:2'-disulphonic acid in 125 parts of water is added. The temperature of the reaction mixture is raised to 40–45° C. and is maintained at this temperature for 2 hours. The pH of the reaction is maintained throughout the heating at 6.0–6.5 by the gradual addition of 2 N-sodium carbonate solution. 140 parts of sodium chloride are added and the mixture is stirred for 15 minutes. The precipitated dye is filtered, washed on the filter with a solution of 200 parts of sodium chloride in 1000 parts of of water and is finally dried in vacuo at room temperature.

The resultant dyestuff is found on analysis to contain 1 atom of hydrolysable chlorine for every molecule of dyestuff. It dyes cellulose textile materials in mid-green shades having good fastness to light and to washing.

*Example 3*

A solution of 20.98 parts of the tetra sodium salt of a mixture of 1-amino-4-(4'-[4''-aminostyryl]-anilino)-anthraquinone - 2:2'':3':5 - and 2:2'':3':8 - tetrasulphonic acids in 200 parts of water is added, during 20 minutes at a temperature of 0–5° C., to a stirred suspension of 5.0 parts of cyanuric chloride in 40 parts of acetone and 150 parts of water. The reaction mixture is stirred for a further 20 minutes at 0–5° C., whilst the pH of the reaction is maintained at 4–5 by the gradual addition of 2 N-sodium carbonate solution. The reaction mixture is filtered, the filtrates are stirred whilst the pH of the filtrates is adjusted to 7 and a solution of 11.1 parts of the disodium salt of 4'-nitro-4-aminostilbene-2:2'-disulphonic acid in 125 parts of water is added. The temperature of the reaction mixture is raised to 40–45° C. and is maintained at 40–45° C. for 75 minutes, the temperature of the reaction is raised to 60–65° C. and is maintained at this temperature for 1 hour. The pH of the reaction mixture is maintained throughout the heating period at 6.0–6.5 by the gradual addition of 2 N-sodium carbonate solution. 75 parts of sodium chloride are added, the reaction mixture is stirred for 1 hour, the precipitated dyestuff is filtered, washed on the filter with a solution of 100 parts of sodium chlorine in 1000 parts of water and is finally dried in vacuo at room temperature.

The resultant dyestuff is found on analysis to contain 1 hydrolysable chlorine atom for each molecule of dyestuff.

When applied to cellulosic textile materials in conjunction with a treatment with an acid binding agent the dyestuff yields bright yellowish green shades having good fastness to light and to washing.

*Example 4*

A solution of 29.76 parts of the dyestuff prepared in Example 1 in 350 parts of water is stirred at room temperature and 70 parts of pyridine are added. The temperature of the mixture is raised to 80° C., and is maintained at 80° C. for 20 minutes. The reaction mixture is poured into 1200 parts of stirred acetone, the precipitated dyestuff is filtered, washed on the filter with 1000 parts of acetone and is finally dried at room temperature in vacuo.

The resultant dyestuff which contains no hydrolysable chlorine, when applied to cellulosic textile materials in conjunction with a treatment with an acid-binding agent, yields yellowish green shades having good fastness to light and to washing.

*Example 5*

A solution of 16.22 parts of the trisodium salt of 1-amino-4-(4'-methylamino anilino)anthraquinone-2:3':5 trisulphonic acid in 250 parts of water is added, during 20 minutes at a temperature of 0–5° C., to a stirred suspension of 4.85 parts of cyanuric chloride in 40 parts of acetone and 150 parts of water. The reaction mixture is stirred for a further 20 minutes at 0–5° C. whilst the pH of the reaction is maintained at 4–5 by the gradual addition of 2 N-sodium carbonate solution. The reaction mixture is filtered, the filtrates are stirred whilst the pH of the filtrates is adjusted to 7 and a solution of 11.1 parts of the disodium salt of 4'-nitro-4-amino-stilbene-2:2' disulphonic acid in 150 parts of water is added. The temperature of the reaction mixture is raised to 40–45° C. and is maintained at this temperature for 6 hours. The pH of the reaction mixture is maintained throughout the heating period at 6.0–6.5 by the gradual addition of 2 N-sodium carbonate solution. 163 parts of sodium chloride are added, the reaction mixture is stirred for 1 hour, the precipitated dyestuff is filtered, washed on the filter with a solution of 300 parts of sodium chloride in 1000 parts of water and is finally dried in vacuo at room temperature.

The resultant dyestuff is found on analysis to contain 1 atom of hydrolysable chlorine for each molecule of dyestuff.

When applied to cellulose textile materials in conjunction with a treatment with an acid-binding agent the dyestuff yields mid-green shades having good fastness to light and to washing.

*Example 6*

A solution of 12.7 parts of the trisodium salt of 1-amino - 4-(4'-aminoanilino)-anthraquinone-2:3':5-trisulphonic acid in 200 parts of water is added, during 30 minutes at a temperature of 15–20° C., to a stirred suspension of 4.27 parts of 5-cyano-2:4:6-trichloropyrimidine in 100 parts of dioxan and 50 parts of water. The reaction mixture is stirred for a further hour at 20° C., whilst the pH of the reaction is maintained at 6–7 by the gradual addition of 2 N-sodium carbonate solution. The reaction mixture is filtered the filtrates are stirred and a solution of 8.9 parts of the disodium salt of 4'-nitro-4-aminostilbene-2:2'-disulphonic acid in 100 parts of water is added. The temperature of the reaction mixture is raised to 80–90° C. and is maintained at this temperature for 10 hours. The pH of the reaction is maintained throughout the heating period at 6–7 by the gradual addition of 2 N-sodium carbonate solution. 100 parts of sodium chloride are added, the reaction mixture is stirred for 1 hour, the precipitated dyestuff is filtered, washed on the filter with a solution of 125 parts of sodium chloride in 500 parts of water and is finally dried in vacuo at room temperature.

The resultant dyestuff is found on analysis to contain 1 hydrolysable chlorine atom for each molecule of dyestuff.

When applied to celulosic textile materials in conjuction with a treatment with an acid-binding agent the dyestuff yields yellowish green shades having good fastness to light and to washing.

*Example 7*

A solution of 30.0 parts of the dyestuff prepared in Example 5 in 350 parts of water is stirred at room temperature and 30.0 parts of 40% aqueous trimethylamine solution are added. The reaction mixture is stirred at room temperature for 1–2 hours, poured into 1200 parts of stirred acetone. The precipitated dyestuff is filtered, washed on the filter with 1000 parts of acetone and is finally dried at room temperature in vacuo.

The resultant dyestuff which contains no hydrolysable chlorine, when applied to cellulosic textile materials in conjunction with a treatment with an acid-binding agent, yields mid-green shades having good fastness to light and to washing.

By substituting in the above example 8.4 parts of 1,4-diazabicyclo[2,2,2]-octane or 3.0 parts of N:N-dimethyl hydrazine for the 30.0 parts of 40% aqueous trimethylamine used in the above example, dyestuffs of similar shades and properties are obtained.

The following are the formulae of other typical dyestuffs of the invention:

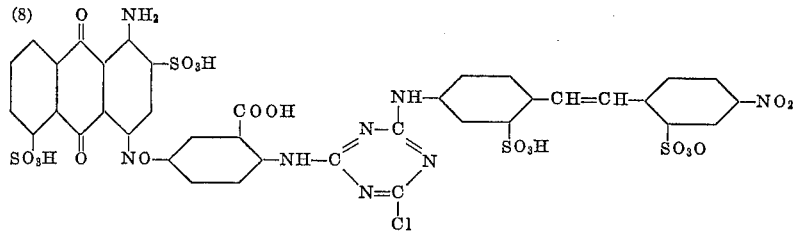

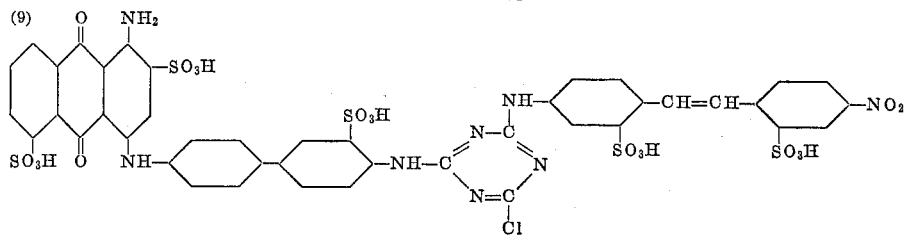

(10) 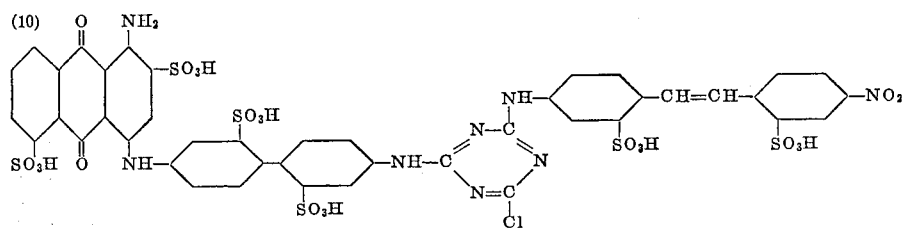
(11) 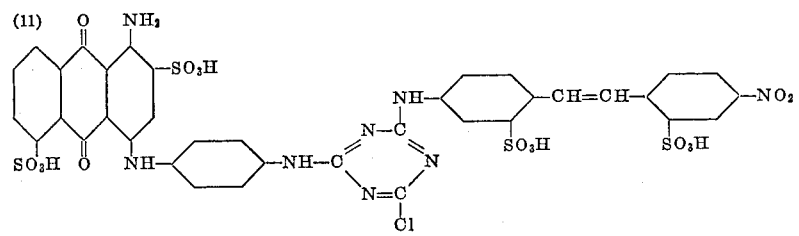
(12) 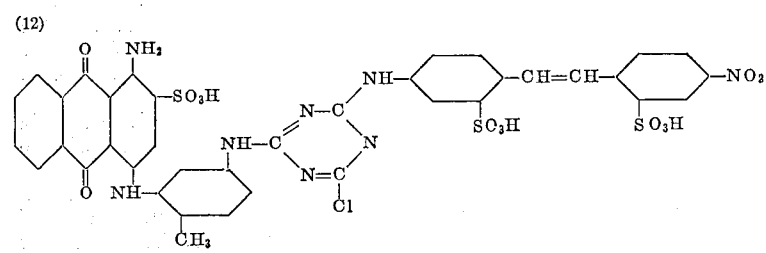
(13) 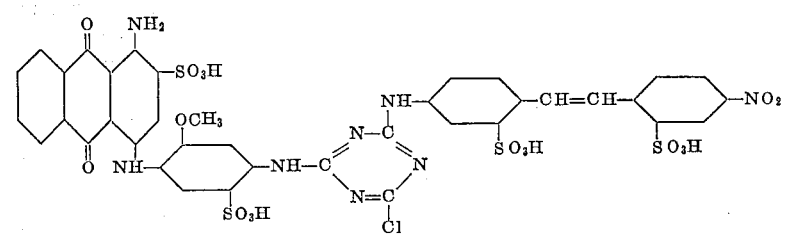
(14) 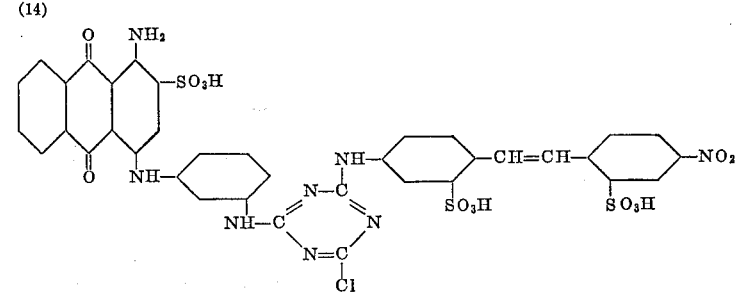
(15) 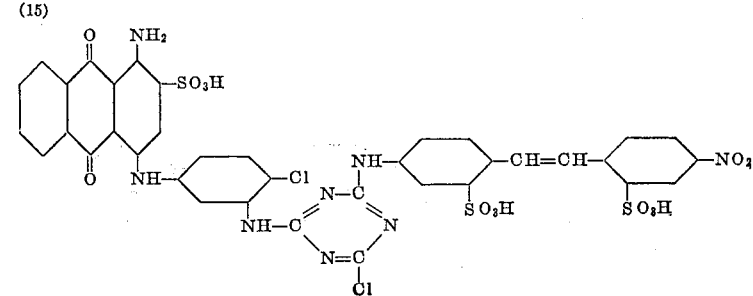

We claim:
1. A water soluble anthraquinone dye of the formula:

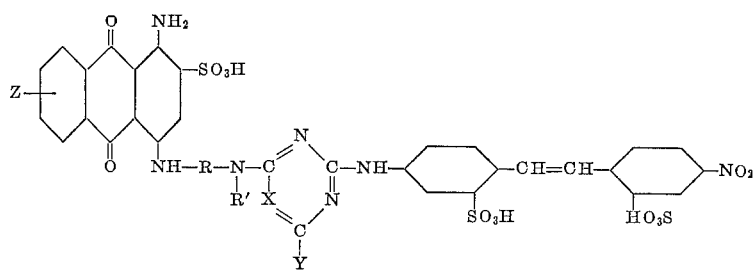

in which Z is selected from the class of substituents consisting of H and SO₃H, R is a radical selected from the class consisting of phenylene, substituted phenylenes in which the substituents are selected from the class consisting of carboxy, lower alkyl, lower alkoxy, sulpho and chlorine, diphenylene, sulphodiphenylene, disulphodiphenylene and disulphostilbene, R' is selected from the class consisting of hydrogen and lower alkyl, X is selected from the class consisting of =N and —C—CN, and Y is selected from the class consisting of Cl,

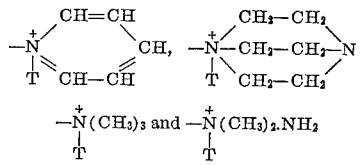

wherein T is a member selected from the group consisting of chloride ions, bromide ions and ionized sulphonic acid groups.

2. The compound of the formula:

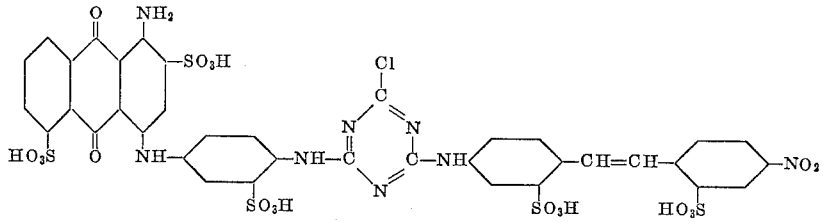

3. The compound of the formula:

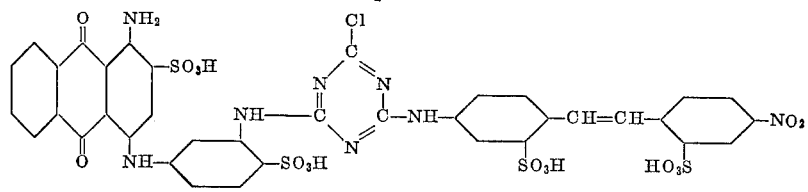

4. The compound of the formula:

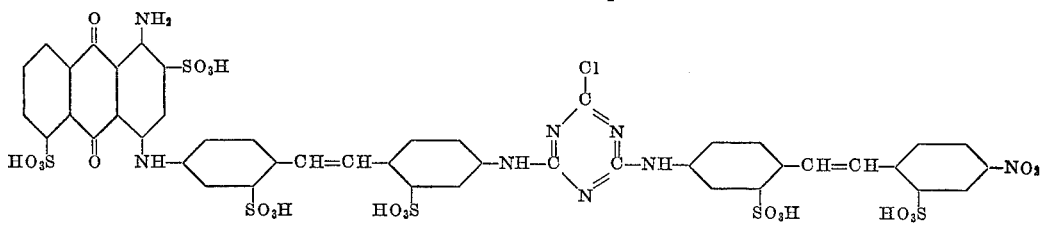

5. The compound of the formula:

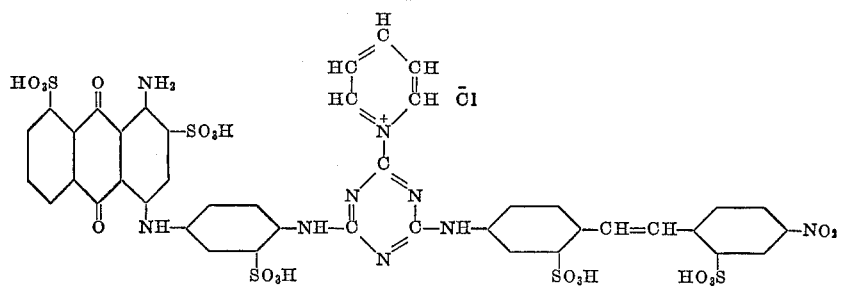

References Cited by the Examiner

UNITED STATES PATENTS

| | | | |
|---|---|---|---|
| 2,824,093 | 2/1958 | Benz et al. | 260—249 X |
| 3,073,824 | 1/1963 | Gunst et al. | 260—249 |
| 3,206,451 | 9/1965 | Benz et al. | 260—249 X |

JOHN D. RANDOLPH, *Primary Examiner.*